PROCESS FOR THERMOELECTRIC CONVERSION

Filed Dec. 22, 1961

INVENTOR.
MAX BETTMAN
BY John F Holemann
ATTORNEY

United States Patent Office 3,255,043
Patented June 7, 1966

3,255,043
PROCESS FOR THERMOELECTRIC CONVERSION
Max Bettman, Seven Hills, Ohio, assignor to Union Carbide Corporation, a corporation of New York
Filed Dec. 22, 1961, Ser. No. 161,594
4 Claims. (Cl. 136—201)

The present invention relates generally to thermoelectric converters and, more particularly, to thermoelectric converters using liquids as thermoelectric materials.

Heretofore, it has been shown that a simple thermocell may be constructed by establishing a temperature gradient across an ionically conducting liquid and supplying electrodes at the hot and cold ends of the liquid. The temperature gradient across the liquid produces an electrical potential between the electrodes and current will flow through an external circuit connected across the electrodes. The total potential developed by such a cell is equal to the homogeneous thermopotential developed in the liquid plus the homogeneous thermopotential developed in the electrodes plus the heterogeneous thermopotential (the difference in potential developed at the two junctions).

A great variety of thermoelectric liquids have been proposed for use in the type of thermocell described above. For example, molten salts have been shown to offer good figures of merit and are operable over relatively wide temperature ranges. However, most of the liquids heretofore proposed as thermoelectric materials conduct the electricity by ionic conduction rather than electronic conduction, i.e., by the movement of positive and negative ions rather than the movement of electrons. In a purely ionic thermocell, there is a chemical reaction at each electrode, a species of ions being produced at one electrode and plated out at the other electrode. As a result, one electrode is continuously consumed while the other electrode is continuously built up. Thus, when solid electrodes are used in an ionic thermocell, they must usually be replaced periodically. When liquid electrodes are used, it is necessary to provide a flow path from one electrode to the other. In a purely electronic thermocell, chemical reactions at the electrodes can be practically eliminated.

It is, therefore, the main object of the present invention to provide a thermoelectric converter employing an electronically conductive liquid.

It is another object of the invention to provide such a thermoelectric converter with a relatively good figure of merit.

It is a further object of the invention to provide such a converter which is capable of operating over relatively wide temperature ranges.

Other aims and advantages of the invention will be apparent from the following description and appended claims.

In the drawings.

Figure 1:
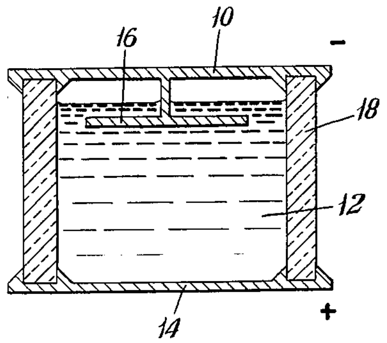
FIG. 1 is a schematic view in elevation of a preferred embodiment of the inventive thermoelectric converter.

In accordance with the present invention, there is provided a thermoelectric converter comprising two spaced-apart electrodes in contact with a solution of a metal in a molten salt of that metal, the amount of said metal in the solution being sufficient to increase the electrical conductivity of the solution to at least three times the electrical conductivity of the molten salt, one of the electrodes being maintained at a temperature above the temperature of the other electrode. The magnitude of the potential developed between the two electrodes depends only on the nature of the electrodes and solution and on the temperatures at the electrode-solution junctions; it is independent of the temperature distribution between the junctions.

The present invention depends on massive electronic conductivity in the metal-metal salt solution to short out the ionic system. Also, inert electrodes are used so that any initial ionic motion is eventually suppressed by polarization effects. Electronic conduction in the metal-metal salt solution is apparently due to the fact that the dissolved metal, or at least a part of it, becomes a donor of fairly mobile electrons. These electrons may be partially or slightly bound, but their mobility as electric current carriers is clearly many times higher than that of any ions found in a molten salt system. In general, a metal-metal salt solution is useful in the present invention only if a solution of about 20 mole percent or less of the metal in its molten salt provides the required conductivity, i.e., a conductivity at least three times as great as the conductivity of the salt alone. The metal is preferably an alkali metal, i.e., lithium, sodium, potassium, rubidium, or cesium, and the metal salt is preferably a halide of the alkali metal. Some examples of suitable alkali metal-alkali metal halide solutions are Cs in CsCl, Na in NaBr, K in KBr, and K in KCl. The electrical conductivity of the potassium systems is usually much higher than the conductivity of the sodium systems (see Journal of American Chemical Society, vol. 80, p. 2077, 1958). Most of the alkali metal-alkali metal halide solutions exhibit a temperature (called consolute) above which the metal and its halide are miscible in all proportions. In general, the higher atomic weight alkali metals are preferred in the present invention because the electrical conductivity of the alkali metals seems to increase with increasing atomic weight and the consolute temperature of the metal tends to decrease with increasing atomic weight, thus permitting operation at lower temperatures. In the case of the cesium and rubidium systems, the consolute temperature is below the melting point of the pure halide.

The only requirement on the proportions of metal and metal salt in the solution is that they produce a solution having an electrical conductivity at least three times as great as the conductivity of the salt alone. One example of a suitable solution is a 1 to 50 mole percent solution of cesium in cesium chloride at a temperature between 700 and 1000° C.; a 5 mole percent solution of cesium in cesium chloride has a resistivity of about 0.076 ohm-cm. at a temperature of 650 to 700° C., as opposed to a resistivity of about 0.84 ohm-cm. for cesium chloride at the same temperature. Although the thermoelectric power of an electronic thermocell employing a Cs-CsCl solution is only about half that of the best ionic thermocells, the electrical conductivity of the electronic thermocell is about ten times higher. Assuming the thermal conductivities of the electronic and ionic thermocells to be about the same, it is obvious that the figure of merit of the Cs-CsCl electronic thermocell is improved by a factor of about 10/4. Other solutions suitable for use in the present invention are a 1 to 20 mole percent solution of Na in NaX at 900 to 1200° C. (X is a halide), a 5 to 20 mole percent solution of K in KCl at 800 to 1100° C., a 1 to 20 mole percent solution of K in KBr at 750 to 1100° C., a 1 to 50 mole percent solution of Cs in CsI at 620 to 1000° C., a 1 to 50 mole percent solution of Rb in RbCl at 725 to 1100° C., a 1 to 50 mole percent solution of Rb in RbBr at 700 to 1100° C., and a 1 to 50 mole percent solution of Rb in RbI at 650 to 1100° C. The temperature of the solution is usually not narrowly critical as long as it is above the freezing point of the solution.

A preferred embodiment of the inventive thermoelectric converter will now be described in greater detail by referring to the drawings.

Referring to FIG. 1, the converter comprises, in general, a first electrode 10, a melt 12 of metal-metal salt solution, and a second electrode 14. The first electrode 10 is a circular plate of electrically conductive material with a protruding section 16 for contacting the solution The melt 12 is contained in a ceramic cylinder 18. The second electrode 14 is sealed to the bottom of the ceramic cylinder 18 so as to form the bottom of the container. A temperature gradient is created and maintained in the melt 12 between the upper electrode 10 and the lower electrode 14 by heating the lower electrode 14 by any suitable heating means (not shown), such as an electric heating coil, heat from a nuclear reactor, etc. For efficient operation, the temperature of the two electrodes may be from 600 to 1200° C. Both electrodes should be inert to the particular metal-metal salt solution employed. For example, when an alkali metal-alkali metal halide solution is used, suitable electrode materials are tantalum, molybdenum, tungsten, or alloys thereof. Some inert stainless steels, such as type 304, are also suitable electrode materials. The ceramic cylinder 18 may be alumina, magnesia, or beryllia when any alkali metal-alkali metal halide solutions except lithium solutions are employed. With lithium solutions, the ceramic material may be beryllia. An inert powder, such as $Al_2O_3$, BeO, or MgO, may be added to the melt 12 to reduce the transfer of heat between the two electrodes by convection in the melt 12.

Figure 2:
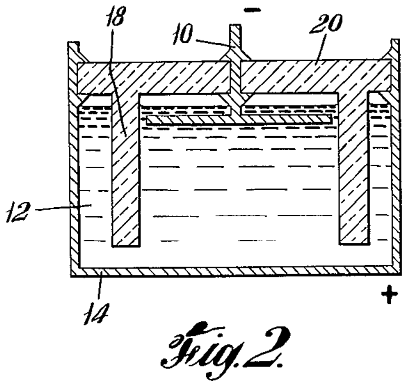
FIG. 2 is a schematic view in elevation of a modification of the embodiment of FIG. 1.

A modified embodiment of the inventive device wherein a metal-to-ceramic junction is required only at the cold junction is shown in FIG. 2. Since it is often easier to provide a metal-ceramic seal for operation at low temperatures than at high temperatures, this modification is desirable from a practical view-point. In FIG. 2, the hot electrode 14 forms both the bottom and sides of the container for the melt 12, and a ceramic plate 20 seals the top of the container and insulates the hot electrode 14 from the cold electrode 10. The vertical cylindrical portion 18 of ceramic plate 20 in the apparatus of FIG. 2 prevents the vertical metal walls of electrode 14 from short-circuiting the thermoelectric current.

In operation, the lower electrode 14 of the apparatus of FIGS. 1 and 2 is maintained at a temperature above the temperature of the upper electrode 10 by heating the lower electrode 14 by any suitable heating means (not shown). As mentioned above, the magnitude of the voltage produced across the two electrodes is determined by the nature of the particular solution and electrodes employed and by the temperatures at the solution-electrode junctions. If an external load is connected across the two electrodes, an electrical current flows through the load circuit.

Figure 3:
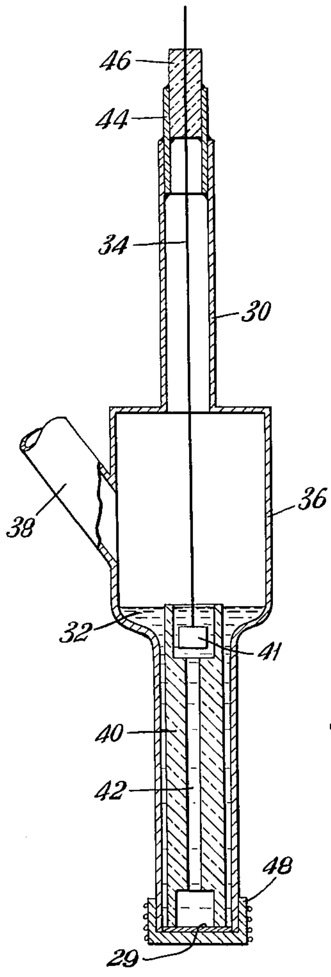
FIG. 3 is a schematic view in elevation of an experimental embodiment of the inventive converter.

In an example of the inventive thermoelectric converter, the apparatus illustrated in FIG. 3 was filled to the level indicated with a 5 mole percent solution of Cs in molten CsCl. Cs-CsCl melt was contained in a stainless steel tube 30 with an enlarged central portion 36. The melt was fed into the central portion 36 of the tube 30 through a filling tube 38. The bottom portion of the tube 30 contained a sapphire dip cell 40 with a central passage 42. The upper portion of the tube 30 was brazed to a molybdenum insert 44 which, in turn, was brazed to a sapphire lead-through insulator 46. A molybdenum wire 34 was brazed into the insulator 46 and extended down into the dip cell 40, where it was inserted and peened into a cylindrical stainless steel (type 304) slug 41 having an external diameter smaller than the internal diameter of the upper cavity in the cell 40. The slug 41, which was suspended above the opening to the passage 42, formed one electrode of the converter, while the bottom 29 of the tube 30 formed the other electrode. A temperature gradient was created and maintained between the two electrodes by heating the bottom electrode 29 with a thimble-shaped heater 48 fitted over the lower end of the tube 30. The heater 48 was a flat-bottomed stainless steel cylinder having several turns of MgO powder-insulated, Inconel sheathed, Chromel heating wire brazed to the outer surface thereof. The temperature gradient between the two solution-electrode junctions was estimated from the readings of three thermocouples, one welded to the bottom of the tube 30, another located just outside the tube 30 at the surface level of the melt 32, and a third welded to the wire 34 just above the insulator 46.

In order to determine whether the conductivity of the Cs-CsCl melt was at least three times as great as the conductivity of CsCl alone, the resistivity of the melt was measured by passing small alternating currents through the melt and measuring the voltage drop across the melt and across a resistor in series with the melt. The frequency of the alternating current was in the range of 100 to 1000 cycles per second. The resistivity of the melt was found to be 0.076 ohm-cm. over a temperature range of 650 to 700° C., which is less than one-third of the resistivity of CsCl alone (0.84 ohm-cm.). Since conductivity is the reciprocal of resistivity, the conductivity of the melt was clearly more than three times as great as the conductivity of CsCl alone. The thermoelectric power of the converter was then measured by measuring the electric voltage between the two electrodes. The temperature of the bottom electrode ranged from 650 to 700° C., the temperature difference between the two electrodes varied from zero to about 20° C., and the thermoelectric power was estimated as 400 microvolts per ° C.

In a second example of the invention, a first electrode in the form of a cylindrical molybdenum tube was brazed to the open end of a sapphire test tube. The other end of the molybdenum tube was brazed to a stainless steel tube which served both as a filling tube and as an electrode contact. Additional electrodes were provided by drilling holes through the sapphire tube and brazing molybdenum over the holes. The sapphire tube had an inner diameter of ⅛ inch, an outer diameter of 0.290 inch, and a length of 1.5 inches. The sapphire tube was filled with a 10 mole percent solution of Cs in CsCl, and the resistivity of the solution was measured as in the previous example. The resistivity was found to be about 0.063 ohm-cm. over a temperature range of 700 to 750° C. With the bottom of the sapphire tube at a temperature between 700 and 750° C. and a temperature difference of about 9° C. between the two electrodes, the thermoelectric power varied between 180 and 330 microvolts per ° C.; the variations were apparently caused by interference from a residual galvanic voltage.

While various specific forms of the present invention have been illustrated and described herein, it is not intended to limit the invention to any of the details herein shown, but only as set forth in the appended claims.

What is claimed is:

1. A process for thermoelectric conversion comprising contacting two spaced-apart inert metal electrodes with an electronically conductive solution of an alkali metal in a molten halide of said alkali metal, the amount of said alkali metal in said solution being sufficient to increase the electrical conductivity of said solution to at least three times the electrical conductivity of said halide, and creating and maintaining a temperature gradient in said solution between said electrodes.

2. A process for thermoelectric conversion comprising contacting two spaced-apart inert metal electrodes with an electronically conductive solution of an alkali metal in a molten halide of said alkali metal, the amount of said alkali metal in said solution being sufficient to increase the electrical conductivity of said solution to at least three times the electrical conductivity of said halide, maintaining said electrodes at a temperature between about 600° C. and about 1200° C., and creating and maintaining a temperature gradient in said solution between said electrodes.

3. The process in accordance with claim 2 wherein said electrodes comprise an inert metal selected from the group consisting of tantalum, molybdenum, tungsten, alloys of the three aforementioned elements, and inert stainless steel.

4. A process for thermoelectric conversion comprising contacting two spaced-apart molybdenum electrodes with an electronically conductive solution of cesium in molten cesium chloride, the amount of cesium in said solution being between about 5 and about 10 mole percent, maintaining said electrodes at a temperature between about 600° C. and about 1200° C., and creating and maintaining a temperature gradient between said electrodes in said solution.

References Cited by the Examiner

UNITED STATES PATENTS

| | | | |
|---|---|---|---|
| 2,301,022 | 11/1942 | Dalpayrat. | |
| 2,310,354 | 2/1943 | Deysher | 136—84 |
| 2,987,568 | 6/1961 | Weininger et al. | |
| 3,170,817 | 2/1965 | Mrgudich | 136—4 |

OTHER REFERENCES

Bronstein et al.: Journal of the American Chemical Society, pages 2077–2081, volume 80, April–June 1958.

Cadoff et al.: Thermoelectric Materials and Devices, 1960, Chapter 14.

Egli: Thermoelectricity, 1960, pages 220–230.

WINSTON A. DOUGLAS, *Primary Examiner.*

JOHN R. SPECK, MURRAY TILLMAN, *Examiners.*